Nov. 12, 1957  J. E. CANDLIN, JR., ET AL  2,812,725
AXLE STEERING MECHANISM
Filed March 16, 1956  3 Sheets-Sheet 1
Fig. 1
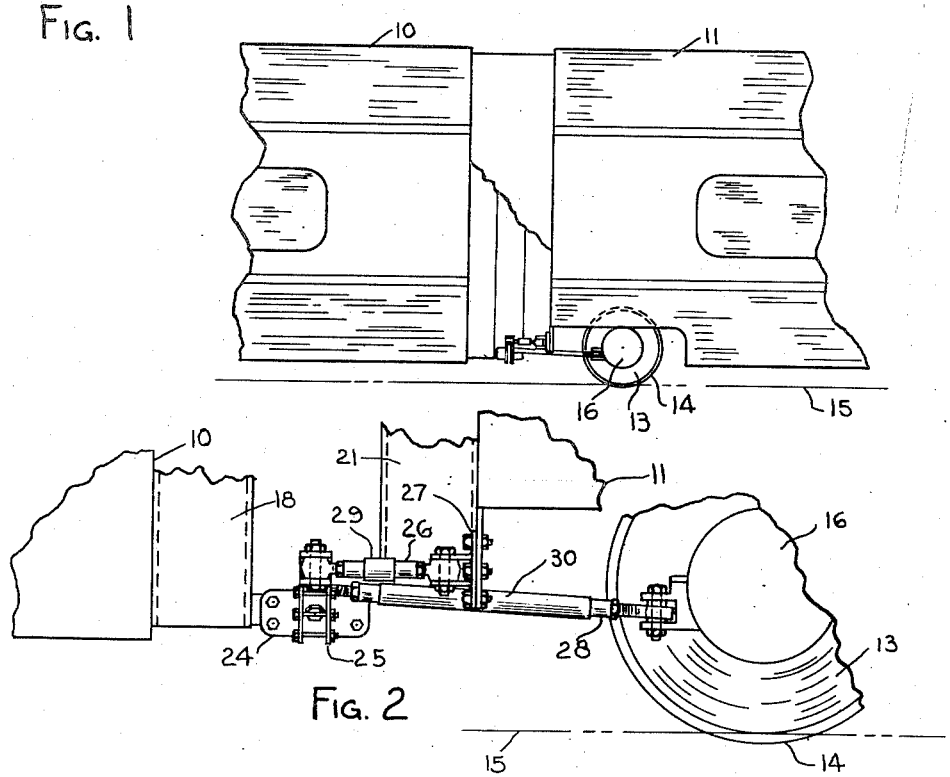
Fig. 2
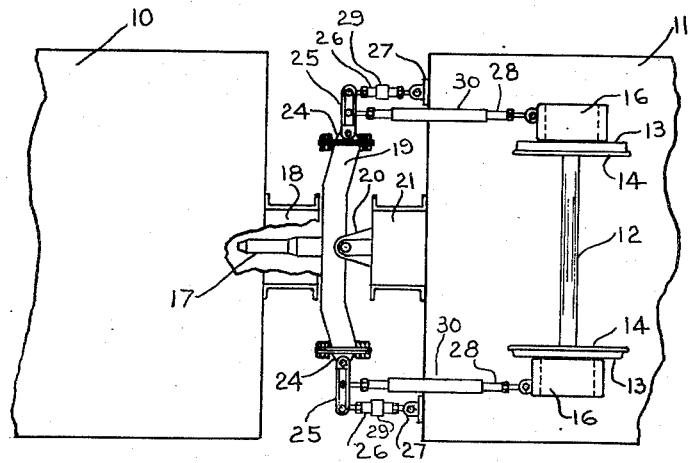
Fig. 3
INVENTORS
JAMES E. CANDLIN, JR. &
WILLIAM VAN DER SLUYS
BY Cromwell, Greist & Warden
ATTORNEYS Nov. 12, 1957  J. E. CANDLIN, JR., ET AL  2,812,725
AXLE STEERING MECHANISM
Filed March 16, 1956  3 Sheets-Sheet 2
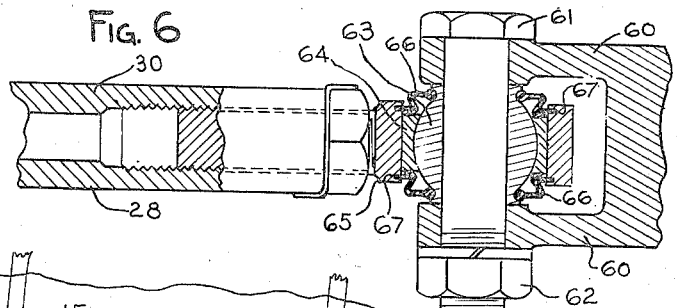
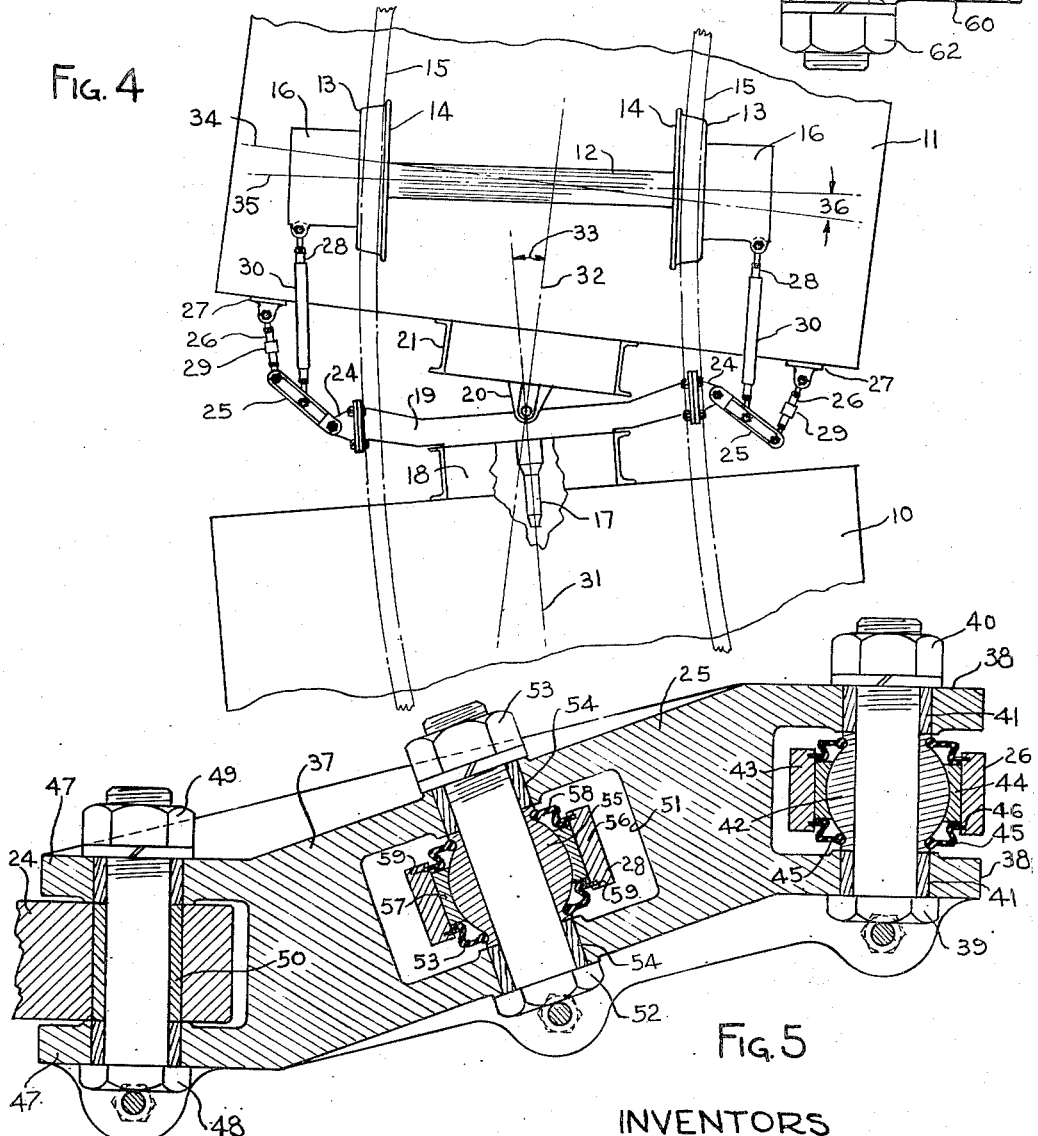
INVENTORS
JAMES E. CANDLIN, JR. &
WILLIAM VAN DER SLUYS
BY Cromwell, Greist & Warden
ATTORNEYS Nov. 12, 1957   J. E. CANDLIN, JR., ET AL   2,812,725
AXLE STEERING MECHANISM
Filed March 16, 1956   3 Sheets-Sheet 3
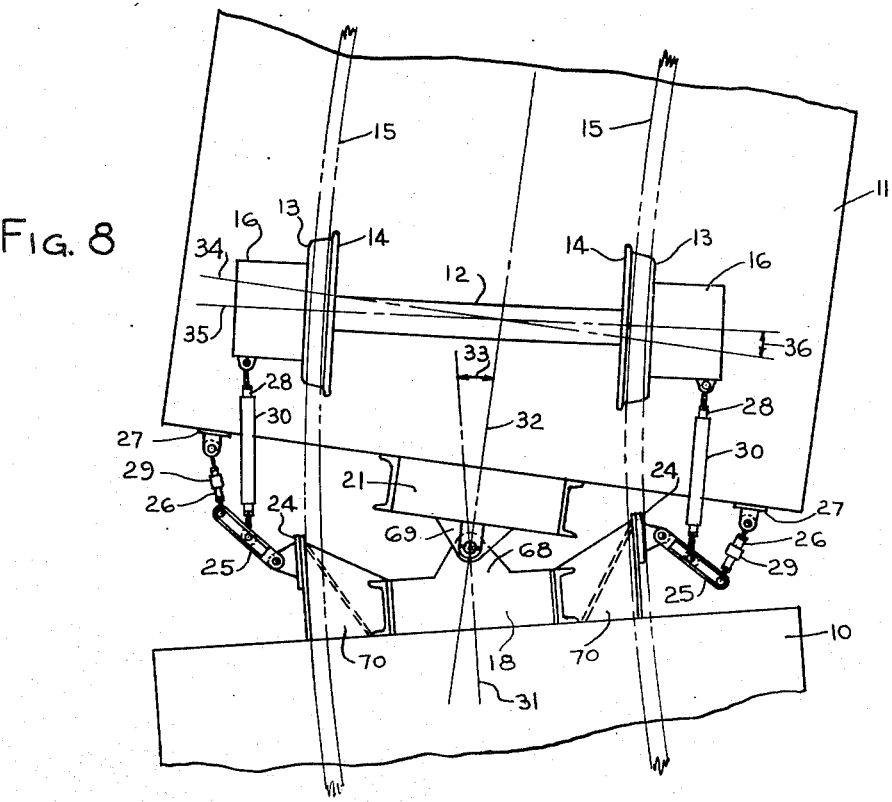
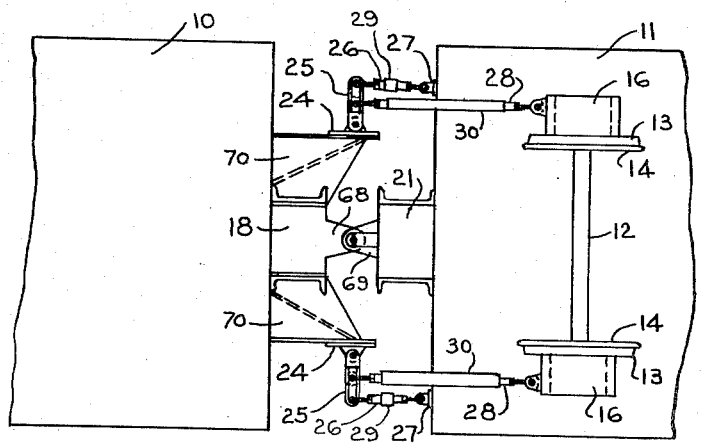
INVENTORS
JAMES E. CANDLIN, JR. &
WILLIAM VAN DER SLUYS
BY Cromwell, Greist & Warden
ATTORNEYS

United States Patent Office 2,812,725
Patented Nov. 12, 1957

2,812,725

AXLE STEERING MECHANISM

James E. Candlin, Jr., Lansing, and William Van Der Sluys, Homewood, Ill., assignors to Pullman-Standard Car Manufacturing Company, Chicago, Ill., a corporation of Delaware Application March 16, 1956, Serial No. 571,863

17 Claims. (Cl. 105—4)

The present invention relates generally to a new and improved axle steering mechanism for use with articulated vehicles wherein it is desired to steer an axle of one vehicle in response to changes in lateral angular relation between the longitudinal center lines of the vehicles. More specifically, the present invention is directed to an axle steering mechanism particularly adapted for use with single axle railway cars utilized in the make-up of high speed, lightweight trains, the axles of the cars being steered in response to lateral relative movement between interconnected cars to allow the train to smoothly and safely negotiate curves during high speed operation.

The steering mechanism to be described is readily adapted for use with many different types of articulated vehicles where it is desired to steer an axle or a plurality of axles of one vehicle in response to lateral relative movement between the axle-carrying vehicle and an adjacent vehicle to which the same is interconnected. Axle steering is of particular use with lightweight, high speed trains which are composed primarily of a plurality of interconnected single axle cars. The single axle of each car is placed near one of its ends thereby providing each car with an independently supported end and an unsupported end. The unsupported end is interconnected with a supported end of an adjacent car in load-bearing relation and the spaced single axles are thus made to provide adequate support for a plurality of interconnected cars of this type. By use of a single axle as well as additional lightweight construction features, the over-all weight of the train is minimized and the train may be efficiently operated at high speeds thereby improving service. Furthermore, the over-all cost of the train, as far as the essential operative elements are concerned, is materially reduced and, as a result, great interest has been shown in the development of lightweight, high speed trains. It is with such trains that the axle steering mechanism of the present invention is particularly adapted for use. However, it should be understood that while the following description is directed to the use of the steering mechanism with single axle cars used in forming lightweight, high speed trains it is not intended to limit the scope of application of the steering mechanism as such may be readily utilized with many different types of articulated vehicles.

In the operation of trains at high speeds in order to provide a comfortable and safe ride it is desirable to steer the axles while a train is rounding a curve to thereby eliminate the tendency of the outer wheel flange to climb the inner vertical surface of the outer rail. In the conventional train the axle is positioned at a right angle to the longitudinal axis of the railway car and if this relation is maintained when the car rounds a curve in the track, the flange of the outer wheel loses its tangential relation with respect to the outer rail and tends to climb the same. Under operation at normal speeds the climbing tendency is insufficient to cause derailment; however, the riding comfort of the car may be adversely affected and the accompanying noise is undesirable. Upon operation at high speeds the tendency of the wheel flange to climb the rail may result in derailment of the car and, of course, the greater the speed of operation the greater effect the tendency of the wheel to climb the rail thereby resulting in a less comfortable ride for the passengers.

Some of the proposed axle steering mechanisms have been found to be complicated and require the mounting of certain elements in relatively inaccessible locations. For example, these steering mechanisms have operative elements mounted on the underside of the car frame thereby requiring access under the car for installation as well as maintenance purposes. An additional disadvantage is the necessity of mounting some of the interconnected elements of the steering mechanism on different cars, thereby necessitating disconnection of the steering arrangement as well as the coupling means when the cars are rearranged or dropped from the train in the railroad yard. The necessity of connecting or disconnecting certain elements of the axle steering mechanism in addition to connecting or disconnecting the coupling means materially adds to the make-up time of a train and furthermore often requires the use of skilled or specially trained personnel to make proper connections. Steering mechanisms which are complicated in design are expensive to manufacture and maintain.

For satisfactory operation it is necessary to minimize the effect of car body roll on the steering mechanism. This usually requires a complex steering system. Lateral sway or roll of the car body is present to a certain extent even though the car is traveling along a stright portion of roadbed during which time positive steering of the axle is undesirable other than to maintain it normal to the longitudinal center line of the car.

It is an object of the present invention to provide a new and improved steering mechanism particularly adapted for use with single axle cars of lightweight, high speed trains and which is of relative simple design, readily installed and maintained, capable of highly efficient long-term operation, mountable in accessible locations and capable of being independently and wholly carried by a single car thereby eliminating the necessity of disconnecting certain portions of the mechanism when yard-coupled cars are rearranged in the railroad yard.

Another object is to provide a new and improved steering mechanism which is provided with certain adjustable elements to allow for manufacturing tolerances or differences in railway car construction upon installation thereof and which may be used with railway cars adapted for yard-coupling or with shop-connected railway cars without the necessity of utilizing different parts or changing the function or design of any of the parts making up the total thereby providing standardization of design and construction for use under varying circumstances.

Still another object is to provide a new and improved axle steering mechanism which is so designed as to be substantially unaffected by car body roll while additionally being simply constructed and adapted for mounting in accessible locations.

Other objects not specifically set forth will become apparent from the following detailed description made in conjunction with the drawings wherein:

Fig. 1 is a fragmentary schematic side elevation of interconnected single axle railway cars provided with the steering mechanism of the present invention;

Fig. 2 is an enlarged fragmentary view in side elevation of the steering mechanism of Fig. 1;

Fig. 3 is a fragmentary bottom plan view of the steering mechanism of Fig. 1;

Fig. 4 is an enlarged bottom plan view similar to Fig. 3, illustrating the operation of the steering mechanism when the interconnected cars carrying the same rounds a curve in the track;

Fig. 5 is an enlarged vertical section of one of the elements of the steering mechanism;

Fig. 6 is an enlarged fragmentary detail view of the interconnection for certain elements of the steering mechanism;

Fig. 7 is a view similar to Fig. 3 illustrating the use of the steering mechanism with shop-connected cars; and Fig. 8 is an enlarged bottom plan view similar to Fig. 4 illustrating the operation of the steering mechanism used with the shop-connected cars of Fig. 7 when the same negotiate a curve in the track.

Adjacent end portions of lightweight, high speed railway cars 10 and 11 are shown in Fig. 1 coupled in load-bearing relation. The unsupported end of the car 10 is carried by the axle supported end of the car 11, the axle 12 thereof (Fig. 3) being positioned inwardly of the end of the car and carrying the usual flanged wheels 13, the flanges 14 of which ride the inside of the rails 15 shown in broken lines. The axle 12 outwardly of the wheels 13 is provided with journal boxes 16 on which the car body is mounted in a known manner. Any suitable car suspension means may be used which permits the axle to pivot horizontally with respect to the car.

In Fig. 3 the cars 10 and 11 are shown interconnected by male and female coupling members, the male coupling member 17 being received in the female coupling member mounting portion 18. The male coupling member 17 is provided with a laterally directed coupling beam 19 pivotally attached to a flange 20 which projects from a coupler mounting portion 21 carried by the car 11.

Referring to Figs. 2 and 3, the steering mechanism associated with the axle 12 includes fulcrum brackets 24 suitably mounted on the opposite ends of the beam 19. Steering levers 25 are pivotally attached at their inner ends to the brackets 24 and extend transversely to the longitudinal axes of the cars 10 and 11. The outer ends of the levers 25 are pivotally attached to steering links 26 which in turn are pivotally attached to fulcrum brackets 27 mounted on the end of the body of the car 11 adjacent the opposite corners thereof. The steering links 26 are generally parallel with one another when the center lines of the cars 10 and 11 coincide. The outer ends of steering rods 28 are pivotally connected to the steering levers 25 intermediate the ends thereof. The steering rods 28 are substantially parallel to the center lines of the cars 10 and 11 when the same coincide and have ends pivotally connected to the journal boxes 16 near the outer ends thereof to allow steering of the axle with minimum force. Each of the steering links 26 and steering rods 28 may include turnbuckles 29 and 30 of known design. The turnbuckles 29 and 30 allow the lengths of the steering links 26 and steering rods 28 to be regulated to compensate for manufacturing tolerances in adjusting the axle 12 into its proper angular relation with the body of the car 11.

Fig. 4 illustrates the operation of the steering mechanism shown in Figs. 2 and 3. In this figure the cars 10 and 11 are illustrated as rounding a curve in the track 15 and, for purposes of explanation, it will be considered that the car 10 is leading the car 11 although it should be understood that direction of travel is immaterial. The male coupling member 17 including the beam 19 follows the lateral change of direction of the car 10 by pivoting on the flange 20 carried by the male coupler mounting portion 21 of the car 11. The center line of the car 10 designated by the broken line 31 changes its relation with respect to the center line of the car 11 which is designated by the broken line 32. The angle of displacement of these center lines, as indicated at 33, must be properly transmitted to the axle 12 to cause the car 10 to steer the car 11 around the curve without the flange 14 of the outer wheel 13 attempting to climb the outer rail 15.

In translating this change in angularity between the center lines, the right rear corner of car 10, as viewed in Fig. 4, moves toward the adjacent corner of car 11 as both cars round the curve. The beam 19 follows the car 10 and the right hand fulcrum bracket 24 is moved toward the car 11. The left rear corner of the car 10 moves away from the car 11 and the left fulcrum bracket 24 follows the car 10. The steering links 26 maintain the ends of the steering levers 25 attached thereto a fixed distance from the fulcrum brackets 27 and the steering levers 25 are rotated in a clockwise direction resulting in the right steering rod 28 moving rearwardly and the left steering rod 28 moving forwardly relative to the car 11. The relative movement of the steering rods 28 turns the axle 12 in a counterclockwise direction and the axle is steered into the curve. To negotiate a curve in the opposite direction the manner in which the right and left assemblies of the steering mechanism operate will be reversed.

The degree of axle turning brought about by the action of the steering mechanism is indicated by the broken lines 34 and 35. Line 34 indicates the longitudinal axis of the axle 12 in its normal relation with respect to the car 11, namely, at right angles to the center line 32 thereof. The broken line 35 indicates the position or angle the longitudinal axis of the axle 12 is caused to take by the action of the steering mechanism. The relation of the axis 35 with respect to the inner vertical surface of the rails 15 will be substantially normal to tangents taken therealong. The angle between the lines 34 and 35 will always be less than the angle of translation 33 between the center lines 31 and 32 of the cars during the rounding of a curve upon measurement of these angles using a common radius. Since the wheel flanges 14 are substantially parallel to a tangent to the inner vertical surfaces of the rails 15, the outer wheel flange will not tend to climb the outer rail. The cars will round the curve quietly and smoothly and curves may thus be safely negotiated at high speeds.

In determining the necessary extent to which the axle 12 is pivoted thereby controlling the angle 36, the location of the axle with respect to the pivot point of the cars must be considered. The angle 36 will always be less than the angle 33 and to obtain the desired degree of steering the lengths of the levers 25 and the location of the point of interconnection of the steering rods 28 with the steering levers 25 intermediate of the ends of the same will be controlling factors.

Figs. 5 and 6 illustrate one form of interconnection which may be used in attaching the ends of the steering rods 28 to the steering levers 25 and the journal boxes 16. As illustrated in Fig. 5, the steering levers 25 are each provided with a central portion 37 which slopes downwardly in an inwardly direction toward the beam 19. The upper end of each steering lever 25 is bifurcated so as to provide vertically spaced ears 38 having registering holes therein which receive a bolt or pin 39 held in place by a nut 40. The bolt 39 carries bushings 41 which centrally position an apertured spherical member 42 received about the bolt 39 and forming a part of a spherical rod end connection of known and conventional design. The principal elements of the connection include a cylindrical eye 43 integrally formed on the end of the steering link 26 and having an insert bearing sleeve 44 cooperating with the outer spherical surface of the member 42 to allow limited universal movement between the steering link 26 and the steering lever 25. Resilient shrouds 45 protect the connection and are clamped to the sleeve 44 by split rings 46 partially received in slots carried by the inner surface of the eye 43. The innermost end of each of the steering levers 25 is also bifurcated so as to provide vertically spaced ears 47 having registering apertures which receive therethrough a bolt or pin 48 held in place by a nut 49 and externally receiving a bushing 50 between the ears 47. The bushing 50 passes through an aperture in the outwardly flanged portion of a fulcrum bracket 24 which in turn is attached to one of the ends of the beam 19. The bolt 48 allows the steering lever 25 to pivot with respect to the fulcrum bracket 24 which in turn is sole support of the steering lever 25 and the adjacent ends of the steering link 26 and steering rod 28.

The body portion 37 of each of the steering levers 25 is provided with a centrally located rectangular aperture 51, the top and bottom walls thereof carrying registering holes which receive a bolt or pin 52 held in place by a nut 53. Bushings 54 centrally position an apertured spherical member 55 received about the bolt 52 and forming a part of a spherical rod end connection of the type previously described. The principal elements of the spherical rod end connection include a cylindrical eye 56 integrally formed on the end of the steering rod 28 and having an insert bearing sleeve 57, the inner surface of which has a spherical conformation for cooperating with the outer spherical surface of the member 55 to provide for limited universal movement of the steering rod 28 with respect to the steering lever 25. Resilient shrouds 58 of flexible material protect the arrangement and are clamped to the sleeve 57 by split resilient rings 59 partially received in upper and lower slots carried by the inner surface of the eye 56. The body portions 37 of the steering levers 25 are inclined downwardly in an inward direction to place the steering rods 28 in a position to allow the same to extend in a substantially horizontal direction toward their associated journal boxes 16. This is best shown in Figs. 1 and 2.

The ends of the steering rods 28 adjacent the journal boxes 16 are similarly connected to the journal boxes for limited universal movement with respect thereto by means of spherical rod end connections. As shown in Fig. 6, each of the journal boxes is provided with spaced ears 60 having aligned holes through which a bolt or pin 61 is received and held by a nut 62. The bolt 61 carries a spherical member 63 which in turn is received in a bearing sleeve 64, the inner surface of which spherically conforms with the member 63. The sleeve 64 is mounted in an eye 65 formed on the adjacent end of the steering rod 28. Flexible shrouds 66 protect the spherical joint from foreign matter and upper and lower split resilient rings 67 received in grooves carried by the eye 65 clamp margins of the shrouds against the sleeve 64. A similar type of universal connection is also utilized between the steering links 26 and their supporting brackets 27.

The limited universal action provided at each of the ends of the steering rods 28 and the ends of the links 26 minimizes the effect of car body roll on the steering of the axle. This particular aspect is important in that undesirable steering of the axle at high speeds cannot only be dangerous but can seriously affect the comfort of the passengers. Car body roll will cause the beam 19, steering levers 25 and steering links 26 to rise and fall to a certain extent. However, the steering rods 28 will not function to pivot the axle nor will the steering links 26 move the levers 25 as the rise and fall of the aforementioned elements of the steering mechanism will be substantially compensated for by the limited universal action of the rod ends. In the same manner self-excited oscillations of the axle due to alternate pushing and pulling of the axle by the steering rods following the rise and fall of the remaining elements will be eliminated or minimized.

As previously described the steering mechanism of the present invention is not only adapted for being wholly mounted on a single car thereby eliminating the necessity of disconnecting any elements of the mechanism when interconnected cars are disconnected following standard railroad yard procedures, but the steering mechanism is also readily adapted for use with shop-connected cars without the necessity of utilizing different parts or different arrangements of the various elements. To illustrate this, Figs. 7 and 8 depict the manner in which the steering mechanism is mounted with respect to cars which are permanently interconnected, such cars being generally referred to as shop-connected cars. As all of the elements of the steering mechanism are identical with the elements previously described, like reference numerals are used in these figures.

The coupling mounting portion 18 of the car 10 is provided with an outwardly directed coupling flange 68 which is pivotally interconnected with an outwardly directed coupling flange 69 carried by the coupling mounting portion 21 of the car 11. This connection is a permanent connection and is made during the assembly of a car unit which is not intended to be disconnected during use. The coupling mounting portion 18 of the car 11 is further provided with laterally extending supports 70 which have mounted thereon, outwardly thereof, the fulcrum brackets 24 previously described. The remaining elements of the steering mechanism are mounted with respect to one another in exactly the same manner as previously described and in referring to Fig. 8 it will be noted that the operation of the steering arrangement is not changed.

The fulcrum brackets 24 being directly mounted on the car 10 will transmit lateral movement of the car 10 with respect to the car 11 to the remaining elements of the steering mechanism and steer the axle 12 of the car 11 with respect to the change in relation of the center lines 31 and 32 of the cars. As a result the wheel flanges 14 will not tend to climb the track 15 and the axle will be steered so as to allow the associated cars to round a curve at high speeds in a comfortable and safe manner.

The ends of the steering rods 28 pivotally attached to the steering levers 25 are preferably associated with these levers at a point centrally located with respect to the ends thereof. However, this point of connection may be relocated depending on the degree of axle steering desired.

As all of the various parts of the steering mechanism are readily accessible either from in between the cars or from the sides thereof, adjustments or servicing of the same may be readily made. It is unnecessary to gain access to the undersurface of either of the interconnected cars. It should be readily apparent that the steering mechanism consists of a small number of parts all of which are simply constructed and the arrangement may be readily understood, installed and serviced without the necessity of using personnel of special skills.

Obviously many modifications and variations of the invention as hereinbefore set forth may be made without departing from the spirit and scope thereof, and therefore only such limitations should be imposed as are indicated in the appended claims.

We claim:

1. An axle steering mechanism associated with articulated vehicles, said mechanism including laterally spaced transversely directed steering levers pivotally attached at their inner ends to a means connected with a first vehicle in substantially non-rotative relation with the longitudinal axis thereof and movable with said first vehicle relative to a second vehicle, steering links pivotally attached to each of the outer ends of said steering levers, said steering links being further pivotally attached to said second vehicle, and steering rods pivotally attached to each of said steering levers intermediate the ends thereof, said steering rods being further pivotally attached to an axle of said second vehicle at points spaced from one another near each end of said axle.

2. An axle steering mechanism associated with articulated vehicles, said mechanism including laterally spaced transversely directed steering levers pivotally attached at their inner ends to a means connected with a first vehicle in substantially non-rotative relation with the longitudinal axis thereof while being connected to a second vehicle for pivoting in a substantially horizontal plane relative thereto, steering links pivotally attached to each of the outer ends of said steering levers, said steering links being further pivotally attached to said second vehicle, and steering rods pivotally attached to each of said steering levers intermediate the ends thereof, said steering rods being further pivotally attached to an axle of said second vehicle at points spaced from one another near each end of said axle.

3. An axle steering mechanism associated with articulated vehicles, said mechanism including laterally spaced transversely directed steering levers pivotally attached at their inner ends to a means connected with a first vehicle in substantially non-rotative relation with the longitudinal axis thereof and movable with said first vehicle relative to a second vehicle, said means including a male coupling member mounted on said second vehicle and coupled with said first vehicle for movement therewith relative to said second vehicle, said male coupling member being pivotally connected to said second vehicle and being provided with a transversely extending portion of substantial length to the ends of which said steering levers are pivotally attached, steering links pivotally attached to each of the outer ends of said steering levers, said steering links being further pivotally attached to said second vehicle, and steering rods pivotally attached to each of said steering levers intermediate the ends thereof, said steering rods being further pivotally attached to an axle of said second vehicle at points spaced from one another near each end of said axle.

4. An axle steering mechanism associated with articulated vehicles, said mechanism including laterally spaced transversely directed steering levers pivotally attached at their inner ends to a means connected with a first vehicle in substantially non-rotative relation with the longitudinal axis thereof while being connected to a second vehicle for pivoting in a substantially horizontal plane relative thereto, steering links pivotally attached to each of the outer ends of said steering levers, said steering links being further pivotally attached to said second vehicle, and steering rods pivotally attached to each of said steering levers intermediate the ends thereof at a point to provide the desired degree of steering action, said steering rods being further pivotally attached to an axle of said second vehicle at points spaced from one another near each end of said axle.

5. An axle steering mechanism associated with articulated vehicles, said mechanism including laterally spaced transversely directed steering levers pivotally attached at their inner ends to a means connected with a first vehicle in substantially non-rotative relation with the longitudinal axis thereof while being connected to a second vehicle for pivoting in a substantially horizontal plane relative thereto, steering links pivotally attached to each of the outer ends of said steering levers, said steering links being further pivotally attached to said second vehicle, and steering rods pivotally attached to each of said steering levers intermediate the ends thereof, said steering rods being further pivotally attached to an axle of said second vehicle at points spaced from one another near each end of said axle, the ends of said steering rods attached to said steering levers being associated therewith at points to maintain associated pairs of steering rods and links in substantially longitudinally parallel relation when the center lines of said vehicles coincide.

6. An axle steering mechanism associated with articulated vehicles, said mechanism including laterally spaced transversely directed steering levers pivotally attached at their inner ends to a means connected with a first vehicle in substantially non-rotative relation with the longitudinal axis thereof while being connected to a second vehicle for pivoting in a substantially horizontal plane relative thereto, steering links pivotally attached to each of the outer ends of said steering levers, said steering links being further pivotally attached to said second vehicle, and steering rods pivotally attached to each of said steering levers intermediate the ends thereof, said steering rods being further pivotally attached to an axle of said second vehicle at points spaced from one another near each end of said axle, said steering links and steering rods being longitudinally adjustable and the ends of said steering rods attached to said steering levers being associated therewith at points to provide the desired degree of steering action.

7. In an articulated train comprising at least two interconnected single axle cars, a first car being supported in load-bearing relation by a second car provided near the supporting end thereof with a single transverse axle carrying laterally spaced wheels and journal boxes outwardly of said wheels, the provision of an axle steering mechanism including laterally spaced transversely directed steering levers pivotally attached at their inner ends to a means connected with said first car in substantially non-rotative relation with the longitudinal axis thereof while being connected to said second car for pivoting in a substantially horizontal plane relative thereto, steering links pivotally attached to each of the outer ends of said steering levers, said steering links being further pivotally attached to said second car, and steering rods pivotally attached to each of said steering levers intermediate the ends thereof, said steering rods being further pivotally attached to said axle near the ends thereof.

8. In an articulated train comprising at least two interconnected single axle cars, a first car being supported in load-bearing relation by a second car provided near the supporting end thereof with a single transverse axle carrying laterally spaced wheels and journal boxes outwardly of said wheels, the provision of an axle steering mechanism including laterally spaced transversely directed steering levers pivotally attached at their inner ends to a means connected with said first car in substantially non-rotative relation with the longitudinal axis thereof and movable with said first car relative to said second car, said means including a male coupling member mounted on said second car and coupled with said first car for movement therewith relative to said second car, steering links pivotally attached to each of the outer ends of said steering levers, said steering links being further pivotally attached to said second car, and steering rods pivotally attached to each of said steering levers intermediate the ends thereof, said steering rods being further pivotally attached to said journal boxes.

9. In an articulated train comprising at least two interconnected single axle cars, a first car being supported in load-bearing relation by a second car provided near the supporting end thereof with a single transverse axle carrying laterally spaced wheels and journal boxes outwardly of said wheels, the provision of an axle steering mechanism including laterally spaced transversely directed steering levers pivotally attached at their inner ends to a means connected with said first car in substantially non-rotative relation with the longitudinal axis thereof and movable with said first car relative to said second car, said means including a male coupling member mounted on said second car and coupled with said first car for movement therewith relative to said second car, said male coupling member being pivotally connected to said second car and being provided with a transversely extending portion of substantial length to the ends of which said steering levers are pivotally attached, steering links pivotally attached to each of the outer ends of said steering levers, said steering links being further pivotally attached to said second car, and steering rods pivotally attached to each of said steering levers intermediate the ends thereof, said steering rods being further pivotally attached to said journal boxes.

10. In an articulated train comprising at least two interconnected single axle cars, a first car being supported in load-bearing relation by a second car provided near the supporting end thereof with a single transverse axle carrying laterally spaced wheels and journal boxes outwardly of said wheels, the provision of an axle steering mechanism including laterally spaced transversely directed steering levers pivotally attached at their inner ends to a means connected with said first car in substantially non-rotative relation with the longitudinal axis thereof while being connected to said second car for pivoting in a substantially horizontal plane relative thereto, steering links pivotally attached to each of the outer ends of said steering levers, said steering links being further pivotally attached to said second car, and steering rods pivotally attached to each of said steering levers intermediate the ends thereof at a point to provide the desired degree of steering action, said steering rods being further pivotally attached to said journal boxes.

11. In an articulated train comprising at least two interconnected single axle cars, a first car being supported in load-bearing relation by a second car provided near the supporting end thereof with a single transverse axle carrying laterally spaced wheels and journal boxes outwardly of said wheels, the provision of an axle steering mechanism including laterally spaced transversely directed steering levers pivotally attached at their inner ends to a means connected with said first car in substantially non-rotative relation with the longitudinal axis thereof while being connected to said second car for pivoting in a substantially horizontal plane relative thereto, steering links pivotally attached to each of the outer ends of said steering levers, said steering links being further pivotally attached to said second car, and steering rods pivotally attached to each of said steering levers intermediate the ends thereof, said steering rods being further pivotally attached to said journal boxes, the ends of said steering rods attached to said steering levers being associated therewith at points to maintain associated pairs of steering rods and links in substantially longitudinally parallel relation when the center lines of said cars coincide.

12. In an articulated train comprising at least two interconnected single axle cars, a first car being supported in load-bearing relation by a second car provided near the supporting end thereof with a single transverse axle carrying laterally spaced wheels and journal boxes outwardly of said wheels, the provision of an axle steering mechanism including laterally spaced transversely directed steering levers pivotally attached at their inner ends to a means connected with said first car in substantially non-rotative relation with the longitudinal axis thereof while being connected to said second car for pivoting in a substantially horizontal plane relative thereto, steering links pivotally attached to each of the outer ends of said steering levers, said steering links being further pivotally attached to said second car, and steering rods pivotally attached to each of said steering levers intermediate the ends thereof, said steering rods being further pivotally attached to said journal boxes, said steering links and steering rods being longitudinally adjustable and the ends of said steering rods attached to said steering levers being associated therewith at points to provide the desired degree of steering action.

13. An axle steering mechanism associated with articulated vehicles, said mechanism including laterally spaced transversely directed steering levers pivotally attached at their inner ends to a means connected with a first vehicle in substantially non-rotative relation with the longitudinal axis thereof while being connected to a second vehicle for pivoting in a substantially horizontal plane relative thereto, steering links pivotally attached to each of the outer ends of said steering levers, said steering links being further pivotally attached to said second vehicle, and steering rods pivotally attached to each of said steering levers intermediate the ends thereof, said steering rods being further pivotally attached to an axle of said second vehicle at points spaced from one another near each end of said axle, said steering rods and links being adapted for at least partial universal movement with respect to the ends thereof.

14. In an articulated train comprising at least two interconnected single axle cars, a first car being supported in load-bearing relation by a second car provided near the supporting end thereof with a single transverse axle carrying laterally spaced wheels and journal boxes outwardly of said wheels, the provision of an axle steering mechanism including laterally spaced transversely directed steering levers pivotally attached at their inner ends to a means connected with said first car in substantially non-rotative relation with the longitudinal axis thereof while being connected to said second car for pivoting in a substantially horizontal plane relative thereto, steering links pivotally attached to each of the outer ends of said steering levers, said steering links being further pivotally attached to said second car, and steering rods pivotally attached to each of said steering levers intermediate the ends thereof, said steering rods being further pivotally attached to said axle near the ends thereof, said steering rods and links being adapted for at least partial universal movement with respect to the ends thereof.

15. An axle steering mechanism associated with articulated vehicles, said mechanism including laterally spaced transversely directed steering levers pivotally attached at their inner ends to a means connected with a first vehicle in substantially non-rotative relation with the longitudinal axis thereof while being connected to a second vehicle for pivoting in a substantially horizontal plane relative thereto, steering links pivotally attached to each of the outer ends of said steering levers, said steering links being further pivotally attached to said second vehicle, each of said steering levers inclining downwardly in an inwardly direction, and steering rods pivotally attached to each of said steering levers intermediate the ends thereof, said steering rods being further pivotally attached to an axle of said second vehicle at points spaced from one another near each end of said axle, said steering links and steering rods being longitudinally adjustable and the ends of said steering rods attached to said steering levers being associated therewith at points to provide the desired degree of steering action.

16. In an articulated train comprising at least two interconnected single axle cars, a first car being supported in load-bearing relation by a second car provided near the supporting end thereof with a single transverse axle carrying laterally spaced wheels and journal boxes outwardly of said wheels, the provision of an axle steering mechanism including laterally spaced transversely directed steering levers pivotally attached at their inner ends to a means connected with said first car in substantially non-rotative relation with the longitudinal axis thereof while being connected to said second car for pivoting in a substantially horizontal plane relative thereto, steering links pivotally attached to each of the outer ends of said steering levers, said steering links being further pivotally attached to said second car, and steering rods pivotally attached to each of said steering levers intermediate the ends thereof, said steering rods being further pivotally attached to said journal boxes near the outermost ends of said journal boxes.

17. In an articulated train comprising at least two interconnected single axle cars, a first car being supported in load-bearing relation by a second car provided near the supporting end thereof with a single transverse axle carrying laterally spaced wheels and journal boxes outwardly of said wheels, the provision of an axle steering mechanism including laterally spaced transversely directed steering levers pivotally attached at their inner ends to a means connected with said first car in substantially non-rotative relation with the longitudinal axis thereof while being connected to said second car for pivoting in a substantially horizontal plane relative thereto, steering links pivotally attached to each of the outer ends of said steering levers, said steering links being further pivotally attached to said second car, said steering levers being inclined downwardly in an inwardly direction, and steering rods pivotally attached to each of said steering levers intermediate the ends thereof, said steering rods being further pivotally attached to said journal boxes near the outer ends of said journal boxes, said steering links and steering rods being longitudinally adjustable to allow compensation to be made for variations in car manufacture without affecting the extent to which an axle is steered by said steering mechanism.

References Cited in the file of this patent

UNITED STATES PATENTS

| | | |
|---|---|---|
| 2,087,377 | Geissen | July 20, 1937 |
| 2,746,398 | Tomas | May 22, 1956 |
| 2,756,688 | Furrer | July 31, 1956 |